United States Patent [19]

Smith

[11] Patent Number: 5,480,186

[45] Date of Patent: Jan. 2, 1996

[54] DYNAMIC ROLL CONTROL SYSTEM FOR A MOTOR VEHICLE

[75] Inventor: Garry R. Smith, Macomb Township, Mich.

[73] Assignee: Ford Motor Company, Dearborn, Mich.

[21] Appl. No.: 363,468

[22] Filed: Dec. 23, 1994

[51] Int. Cl.$^6$ ........................................... B62D 9/02
[52] U.S. Cl. ..................... 280/772; 280/689; 280/707; 280/714
[58] Field of Search ....................... 280/689, 772, 280/707, 714

[56] References Cited

U.S. PATENT DOCUMENTS

| | | | |
|---|---|---|---|
| 3,861,696 | 1/1975 | Gustafsson | 280/6.12 |
| 4,844,506 | 7/1989 | Moriguchi et al. | 280/689 |
| 5,004,264 | 4/1991 | Kozaki et al. | 280/707 |
| 5,056,812 | 10/1991 | Takehara et al. | 280/707 |
| 5,087,072 | 2/1992 | Kawarasaki | 280/772 |
| 5,104,143 | 4/1992 | Yonekawa | 280/707 |
| 5,161,822 | 11/1992 | Lund | 280/772 |
| 5,186,486 | 2/1993 | Hynds et al. | 280/689 |
| 5,257,814 | 11/1993 | Kohara | 280/707 |
| 5,362,094 | 11/1994 | Jensen | 280/689 |

*Primary Examiner*—Kenneth R. Rice
*Attorney, Agent, or Firm*—Gregory P. Brown; Roger L. May

[57] ABSTRACT

A dynamic roll control system for a suspension system of a motor vehicle (10) provides dynamic roll stabilization during motor vehicle steering maneuvers by predicting a theoretical lateral weight transfer and corresponding degree of motor vehicle roll. A roll control signal (116) is generated for controlling a roll control valve (110) in response thereto. An actuation flow (98) is distributed to roll control actuators (72) by a distribution valve (132) to resist the predicted roll.

11 Claims, 4 Drawing Sheets

DYNAMIC ROLL CONTROL SYSTEM FOR A MOTOR VEHICLE

BACKGROUND OF THE INVENTION

1. Field of the Invention

This invention relates generally to suspension systems for use in motor vehicles. More specifically, the present invention relates to a dynamic roll control system for reducing the roll of a vehicle induced by lateral acceleration during turning maneuvers.

2. Disclosure Information

The use of stabilizer bars in motor vehicle suspension systems is well-known. The purpose of a stabilizer bar is to control vehicle roll during handling maneuvers such as fast lane changes, hard cornering, etc. A relatively large diameter- stabiliizer bar offers greater resistance to roll than a relatively small diameter bar, and can substantially eliminate roll. However, very large stabilizer bars have the drawback in that they considerably degrade ride quality due to an increase in impact harshness when only one wheel on an axle encounters a road disturbance. Too small of a stabilizer bar does not provide the desired resistance to roll.

Generally, a stabilizer link is installed between a control arm and a stabilizer bar. Rigid links are commonly used for this purpose. When the control arm moves in response to a road input, the ink transmits all or part of the movement into the stabilizer bar. The torsional spring effect of the stabilizer bar transmits a force to the opposite control arm to resist rolling motion of the vehicle. One approach to improving the operation of stabilizer bars has been to include an active element in place of the rigid link. While this may be an operable approach to the problem, it provides significant cost challenges. The feedback control system requires elaborate electronics and a compliment of sensors. It would be desirable to provide the benefit of an adjustable actuator to replace the fixed link without incurring the complexity and cost associated with an active control system.

It would therefore be desirable to have a dynamic roll control system operated by a control module capable of predicting the vehicle roll, and generating an actuation signal responsive to the predicted roll.

SUMMARY OF THE INVENTION

The present invention provides a dynamic roll control system for a suspension system on a motor vehicle. In the presently preferred embodiment, the dynamic roll control system comprises a fluid supply source for providing a supply flow of a fluid and a roll control valve for receiving the supply flow and producing an actuation flow in response to a roll control signal generated by a control module. The roll control signal is calculated from a vehicle speed signal and a lateral weight transfer property of the vehicle.

The dynamic roll control system further includes a roll control actuator interconnecting a stabilizer bar to a suspension arm. The actuator includes a cylinder having upper and lower ports and a piston slidably disposed in the cylinder between the upper and lower ports.

The present invention also includes a distribution valve having an input port for receiving the actuation flow, a first actuation port in communication with the upper port of the roll control actuator and a second actuation port in communication with the lower port of the roll control actuator. The distribution valve also includes a return port for directing the actuation flow to the return flow.

The roll control system also includes a control device for controlling the distribution valve. The control device directs the actuation flow to one of the actuation ports, thereby providing the roll control actuator with the actuation flow as required to oppose a predicted lateral weight transfer of the motor vehicle.

It is an advantage of the dynamic roll control system to reduce roll of the motor vehicle during steering maneuvers without compromising the ride quality during straight ahead travel.

Other objects, features and advantages of the present invention will become apparent to those skilled in the art from the drawings, detailed description and claims which follow.

DETAILED DESCRIPTION OF THE PREFERRED EMBODIMENTS

Figure 1:
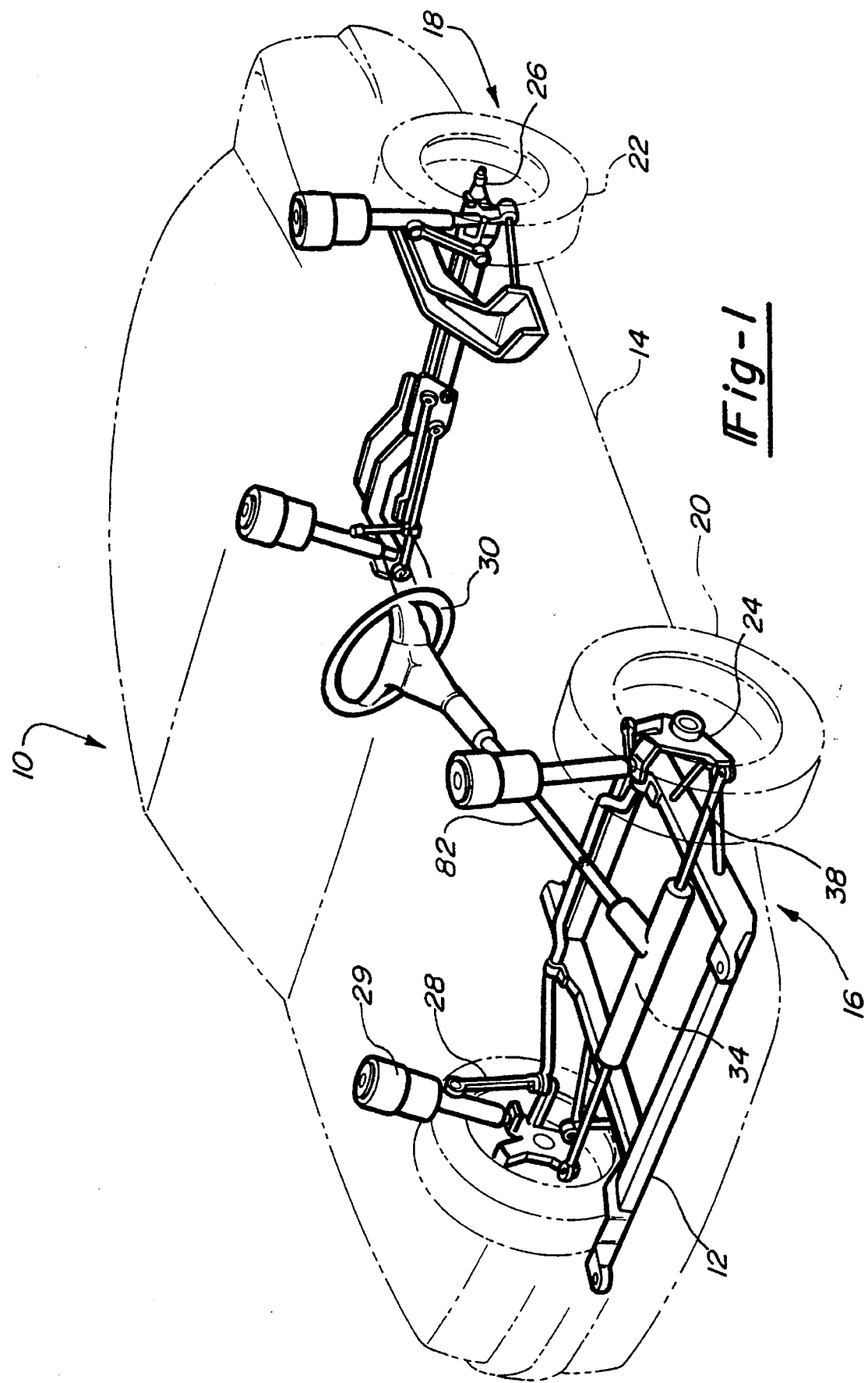
FIG. 1 is a perspective drawing of a motor vehicle according to the present invention.

Referring now to FIG. 1, a motor vehicle 10 for which the present invention is intended is illustrated. The motor vehicle 10 includes a frame 12, a body structure 14 and a powertrain (not shown) supported by front and rear suspensions, 16, 18. (Unless otherwise indicated, only one side of the suspension will be described herein, it being understood that the opposite side is a mirror image of that being described.) The front and rear suspensions 16, 18 may be of conventional design, including steerable and non-steered road wheels 20, 22, respectively, rotatably supported on front and rear wheel support members 24, 26. In the presently preferred embodiment, front and rear suspensions are of the independent type, each having a separate lower control arm 28, conventional strut 29 (or shock absorber) and a spring (not shown.) Alternatively, for purposes of the present invention, the vehicle may be equipped with any other known suspension arrangement while still providing the same operability and functionality.

The motor vehicle 10 also includes a steering shaft 32 having a steering wheel 30 attached at one end and a drive member 34 attached at an opposite end. The drive member 34 translates rotational inputs from the steering wheel 30 into linear reciprocal motion of the drive member 34, which is transferred to a steering linkage, including a tie rod 36 to a steering arm 42 attached to the front wheel support member 24. The steering system may also include electric or hydraulic power assist.

Figure 2:
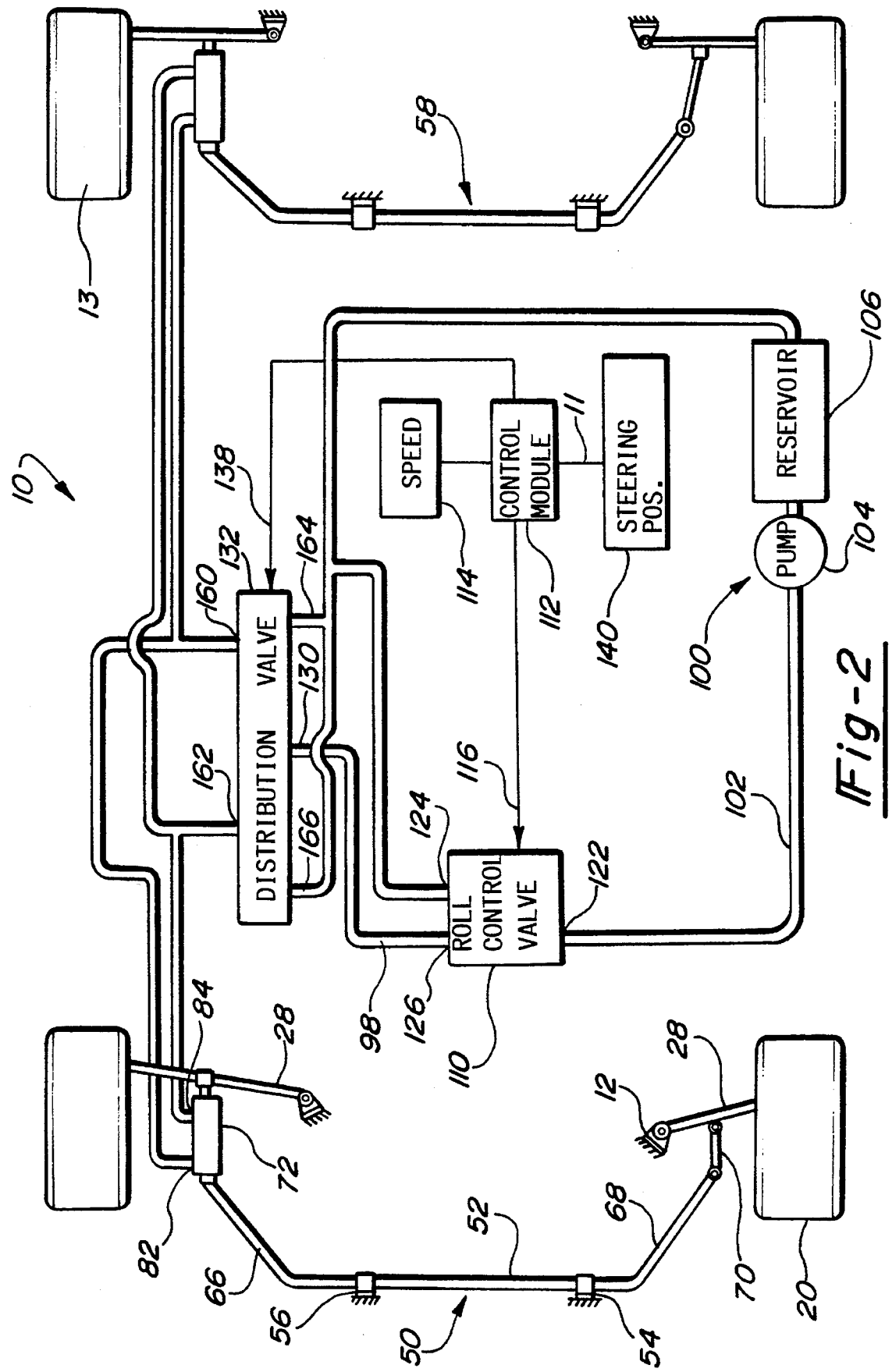
FIG. 2 is a schematic view of a motor vehicle having a dynamic roll control system according to the present invention.

FIG. 2 shows a schematic illustration of a dynamic roll control system integrated with a motor vehicle 10 according to the present invention. A front stabilizer bar 50 includes a central portion 52 transversely mounted to the chassis by brackets 54, 56. In the presently preferred embodiment, a rear stabilizer bar 58 is mounted in the motor vehicle 10 and integrated in the roll control system in the same manner as the front stabilizer bar 50. For this reason, except where otherwise noted, the description of the roll control system will be directed to the front stabilizer bar 50, understanding that the system connections are simply duplicated for the rear stabilizer bar 58.

The stabilizer bar 50 includes attachment arms 66, 68 which project from opposite ends of and substantially transverse to the central portion 52 and connect to the lower arm 28 adjacent to the wheel support member 24. Alternatively, the stabilizer bar 50 may attach directly to the wheel support member 24 or to the strut 29 adjacent the wheel support member 24. In the presently preferred embodiment one side of the stabilizer bar is connected to the lower arm on one side with a conventional fixed length link 70, while the opposite side is connected with a dynamically controlled roll control actuator 72. It is contemplated that the roll control actuator 72 could be installed on both sides, however, the present invention permits the economically beneficial ability to use only one.

Figure 3:
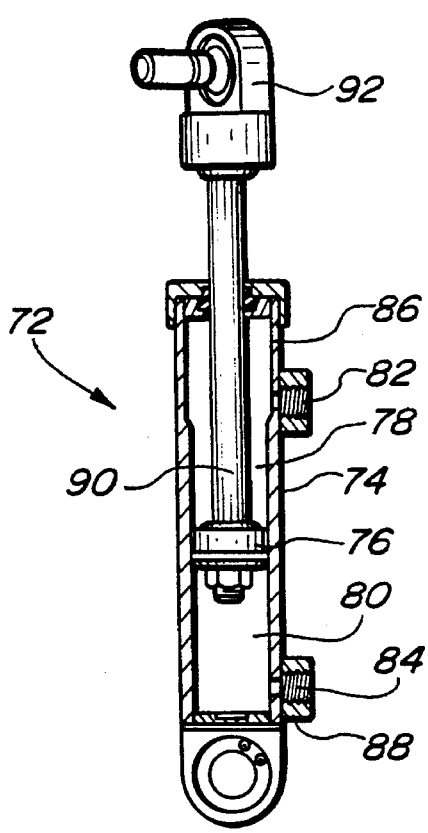
FIG. 3 is a side view, partially cut away, of a roll control actuator according to the present invention.

Referring now to FIG. 3, the roll control actuator 72 includes a cylinder 74 in which there is a slidably disposed piston 76 that divides the interior space of the cylinder into upper and lower chambers 78, 80. An actuation flow of fluid under pressure can be supplied into and discharged from the upper and lower chambers 78, 80 through upper and lower ports, 82, 84, respectively, opening into the cylinder 74 at its upper and lower ends, 86, 88 respectively. The piston 76 is mounted on the lower end of a piston rod 90 which coaxially extends within the cylinder 74 and has an upper rod end 92 projecting out of the cylinder 74 through a seal 96.

Referring back now to FIG. 2, there is an electronically controlled fluid circuit for providing the actuation flow 98 to the upper and lower ports 82, 84 of the roll control actuator 72. A fluid supply source 100 provides a supply flow 102 of fluid to operate the system. In the presently preferred embodiment the fluid supply source 100 includes a constant flow pump 104 receiving fluid from a reservoir 106 that is replenished with fluid from a return flow 108.

The supply flow 102 feeds into a roll control valve 110. In the presently preferred embodiment the roll control valve 110 is operatively connected with and controlled by a control module 112. The roll control valve 110 produces the actuation flow 98 in response to commands from the control module 112, and diverts the remainder of the supply flow 102 into the return flow 108.

Figure 4:
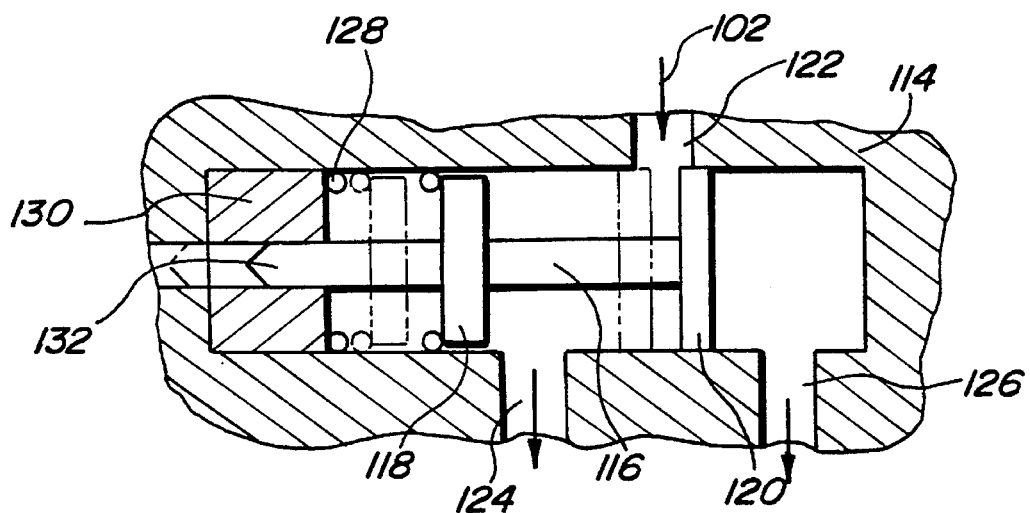
FIG. 4 is a sectional view of a roll control valve according to the present invention.

As is shown in FIG. 4, the roll control valve 110 includes a valve sleeve 114 and a valve spool 116 with external lands 118, 120 which register with corresponding internal lands of the valve sleeve 114. The supply flow 102 enters a first roll control valve port 122 and is distributed to second and third roll control valve ports 124, 126. A valve spring 128 biases valve spool 116 toward the third roll control valve port 126. A solenoid 130 surrounds a solenoid armature 132 which is connected to the valve spool 116.

Referring back now to FIG. 2, the roll control valve 110 directs the actuation flow 98 to a distribution valve 132. The distribution valve 132 distributes the actuation flow 98 to either the upper or the lower port 82, 84 in response to a distribution signal 138 generated by control module 112 based on a steering position signal 140.

Figure 5:
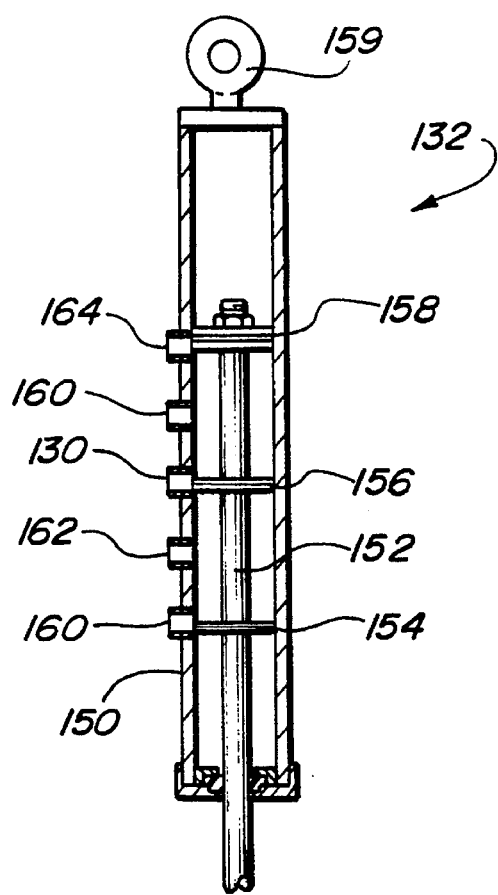
FIG. 5 is a side view, partially cut away, of a distribution valve according to the present invention.

Referring now to FIG. 5, a mechanically controlled distribution valve 132 includes a distribution sleeve 150 and a distribution spool 152 with external lands 154, 156, 158 which register with corresponding internal lands of the distribution sleeve 150. One end of the distribution sleeve includes an anchor 159 for securing the distribution valve to the chassis 12. This linearly reciprocating distribution valve 132 may be replaced by a rotary configuration to enhance package efficiency while providing equivalent operability and functionality.

The actuation flow 98 enters the distribution valve 132 through input port 130 for distribution to first and second actuation ports 160, 162. The first actuation port 160 provides bi-directional fluid communication with the upper port 82 of the roll control actuator 72. Similarly, the second actuation port 162 provides bi-directional fluid communication with the lower port 84. The actuation flow 98 returns to the reservoir 106 through first and second return ports 164, 166.

The mechanically controlled distribution spool 152 connects to a drive member 34 in the steering system through a connecting rod linkage 168 for translation in relation to the steering position. Alternatively, the distribution valve 132 may be electronically controlled by a solenoid as described in relation to the roll control valve 110.

Referring back to FIG. 2, the control module 112 includes a microprocessor and may be arranged according to a number of different architectures. Those skilled in the art will appreciate, in view of this disclosure, that each such architecture could generally include an input-output control circuit (I/O) for exchanging data with external devices and a random access memory (RAM) for temporarily holding data while the data are being processed. Control programs including unit commands will be sequentially read from a read-only memory (ROM). Unit commands will be executed by a central processing unit (CPU).

Vehicle speed and steering position signals 114, 140 are obtained by the control module for use in calculating roll control and distribution signals 116, 138. When the distribution valve 132 is not mechanically connected to the distribution spool 152 by the connecting rod linkage 168, the control module 112 calculates a distribution signal according to the following equation:

$$DS = K_s \Gamma$$

where DS is the distribution signal, $K_s$ is a steering gain constant, and F represents the steering position.

The roll control signal is determined by the equation:

$$RCS = \left[ \frac{KWh}{K_x r(t_f r_f a_f + t_r r_r a_r)} \right] \left[ \frac{V^2}{lg + K_{us} V^2} \right]$$

where RCS is the roll control signal 116 sent to the roll control valve 110, K is a conversion factor required to drive the electronics of the roll control valve 110, W is the vehicle weight, h is the vertical distance from the vehicle center of gravity to the vehicle roll axis, V is the vehicle velocity based on the vehicle speed signal, $K_x$ gain factor based on the steering position, r is the steering arm length in inches, $t_f$ and $t_r$ front and rear track, respectively, $r_f$ and $r_r$ are front and rear stabilizer bar ratios, $a_f$ and $a_r$ are front and rear roll control actuator piston areas, l is wheelbase, g is gravity, and $K_{us}$ is a vehicle understeer coefficient, which is most commonly empirically determined for a given vehicle.

This roll control signal is a theoretical estimation of the lateral weight transfer property inherent in the vehicle when maneuvering through a turn at a given speed. The equation results in a unique relationship for each different vehicle design. Utilizing this equation, an accurate prediction can be made of the vehicle roll, thereby eliminating the need for costly feedback control algorithms and sensors. For a specific vehicle design, this equation reduces to the following simplified equation:

$$RCS = A*V_2/(B+C*V^2)$$

where RCS=is the roll control signal 116, A, B and C are constants based on specific characteristics for a given vehicle design, V is the vehicle velocity based on the vehicle speed signal 114.

Operation of a dynamic roll control system according to a first embodiment represented in FIG. 2 will now be described. The supply flow 102, generated the fluid pump 104 from fluid in the reservoir 106, enters the roll control actuation valve 110 through the first roll control valve port 122. The control module determines the vehicle speed from the vehicle speed signal 114 and generates a roll control signal 116 accordingly.

Referring now to FIGS. 2 and 4, the control module 112 then sends the roll control signal 116, which may be in the form of a square wave signal as generated through pulse width modulation, to the solenoid 130 to control the roll control valve 110. The roll control valve is controlled by increasing the duration of the pulses to increase the effective force acting on the valve spool 116. When the windings of the solenoid 130 are energized, valve spool 116 moves toward the second roll control valve port 124 thereby restricting the passage of fluid between the first and second roll control valve ports 122, 124, thereby creating an actuation flow 98 through the third roll control port 126. When the current in the solenoid windings is decreased, spring 128 moves the spool valve 116 back toward the third roll control valve port 126 thereby restricting flow between the first and third roll control valve ports 122, 126, thereby diverting the supply flow 102 into the return flow 108 through the second roll control port 124.

The actuation flow 98, being tuned to the particular velocity of the vehicle then enters the distribution valve 132 through input port 130. The distribution valve 132 distributes the actuation flow 98 according to the steering position of the vehicle. In an electronically controlled distribution valve 132, the control module determines the steering position 140 and generates a distribution signal 138 accordingly. The control module 112 then sends the distribution signal 140 to the distribution valve 132 where the incoming actuation flow 98 is distributed to the roll control actuators 72 in proportion to the magnitude of the steering position signal 140.

Referring to FIGS. 2, 3 and 5, when the distribution spool 152 moves toward the first actuation port 160, actuation flow 98 enters the second actuation port 162 and is communicated to the lower port 84 of the roll control actuator 72. A differential pressure is established between the lower changer 80 and the upper chamber 78, creating an actuation force, proportional to the surface area of the piston 76 that is reacted through the stabilizer bar 50. This force resists rolling of the motor vehicle 10. As the actuator adjusts position, fluid flows from the upper chamber 78 through the upper port 82 into the distribution valve 132 through the first actuation port 160. Excess fluid passes out of the distribution valve 132 through second return port 166.

Similarly, when the distribution spool 152 moves toward the second actuation port 162, actuation flow 98 flows into the roll control actuator in the opposite direction, reversing the differential pressure, and causing an actuation force that is oppositely directed for resisting opposite roll.

Figure 6:
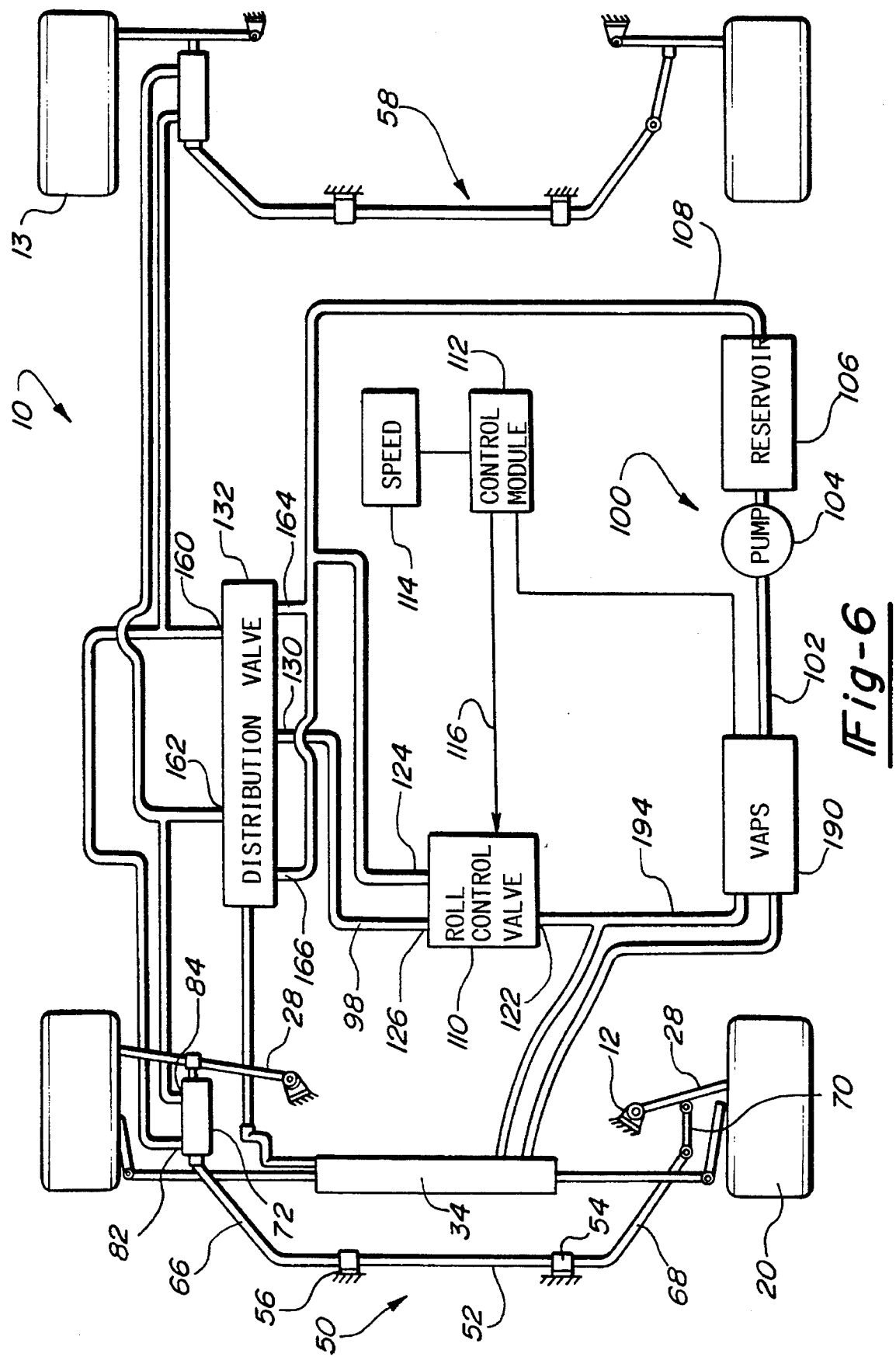
FIG. 6 is a schematic view of a motor vehicle having a dynamic roll control system integrated with a variable assist power steering system according to the present invention.

FIG. 6 illustrates an embodiment of the present invention integrated in a motor vehicle 10 having variable assist power steering mechanism. This dynamic roll control system is integrated with the power steering system. This provides significant efficiencies. For instance, a common fluid pump 104 can provide a supply flow for power steering and dynamic ride control. Additionally, this system illustrates connecting rod linkage for mechanically controlling the distribution valve 132. The differences in operation of this system will now be discussed.

The variable assist power steering system includes a speed sensitive steering valve 190 controlled by a power steering signal generated by the control module responsive to the vehicle speed signal 114. In a manner familiar to those skilled in the power steering arts, the speed sensitive steering valve 190 directs a steering flow 192 to the drive member 34 and the remainder of the supply flow 102 to a bypass flow 194. The steering flow exits the drive member to rejoin the bypass flow 194, thereby representing the original supply flow 102, which then enters the first roll control valve port 122. The remaining operation of the system is identical to that of the first embodiment. The connecting rod 168 includes a first member 196 attached to the drive member 34, and a rocker arm 198 interconnecting the first member to a second member 200 attached to the distribution spool 152.

The foregoing description presents one embodiment of the present invention. Details of construction have been shown and described for purposes of illustration rather than limitation. Modifications and alterations of the invention may occur to those skilled in the art. It is the following claims, including all equivalents, which define the scope of my invention.

I claim:

1. A roll control system for use in a motor vehicle, said roll control system comprising:

a fluid supply source for providing a supply flow of a fluid;

a roll control valve for receiving said supply flow and producing an actuation flow in response to a roll control signal generated by a control module, said roll control signal being calculated from a vehicle speed signal and a lateral weight transfer property of said vehicle;

a roll control actuator interconnecting a stabilizer bar to a suspension arm, said actuator including a cylinder having upper and lower ports and a piston slidably disposed in said cylinder between said upper and lower ports;

a distribution valve having an input port for receiving said actuation flow, a first actuation port in communication with said upper port of said roll control actuator and a second actuation port in communication with said lower port of said roll control actuator and a return port for directing said actuation flow to said return flow; and control means for controlling said distribution valve, said control means being operative to direct said actuation flow to one of said actuation ports, thereby providing said roll control actuator with said actuation flow as required to oppose a predicted lateral weight transfer of said motor vehicle.

2. A roll control system according to claim 1, wherein said control means is operative to control said distribution valve in response to a steering position signal generated by said control module.

3. A roll control system according to claim 1, wherein said control means comprises:

a drive mender interconnecting a steering shaft and a steering linkage of said motor vehicle, said drive member being moveable in response to an operator exerted effort applied to said steering shaft;

a connecting rod means interconnecting said drive member to said distribution valve, said connecting rod means being operative to control said distribution valve to direct said actuation flow to one of said actuation ports according to the position of said drive member, thereby providing said roll control actuator with said actuation flow as required to oppose said predicted calculated lateral weight transfer of said motor vehicle.

4. A roll control system according to claim 1, wherein said fluid supply source further comprises:

a reservoir for receiving a return flow of a fluid; and a pump for receiving said fluid from said reservoir and providing a supply flow from said fluid.

5. A roll control system according to claim 1, wherein said roll control signal is determined according to the following relationship:

$$RCS = A*V_2/(B+C*V^2)$$

wherein: RCS=roll control signal;
A,B,C=constants based on vehicle characteristics; and
V=vehicle speed.

6. A roll control system for use in a motor vehicle, said roll control system comprising:

a reservoir for receiving a return flow of a fluid; and a pump for receiving said fluid from said reservoir and providing a supply flow from said fluid.

a speed sensitive steering valve for receiving said supply flow and producing a steering flow and a bypass flow in response to a vehicle speed signal from a control module;

a drive member interconnecting a steering shaft and a steering linkage of said motor vehicle, said drive member being moveable in response to an operator exerted effort applied to said steering shaft, said steering flow being operative to reduce said operator effort required to move said drive member;

a roll control valve for receiving said steering flow and said bypass flow and producing an actuation flow in response to a roll control signal generated by a control module, said roll control signal being calculated from said vehicle speed signal and a lateral weight transfer property of said vehicle;

a roll control actuator interconnecting a stabilizer bar to a suspension arm, said actuator including a cylinder having upper and lower ports and a piston slidably disposed in said cylinder between said upper and lower ports; a distribution valve having an input port for receiving said actuation flow, a first actuation port in communication with said upper port of said roll control actuator and a second actuation port in communication with said lower port of said roll control actuator and a return port for directing said actuation flow to said return flow; and connecting rod means interconnecting said drive member to said distribution valve, said connecting rod means being operative to control said distribution valve to direct said actuation flow to one of said actuation ports according to the position of said drive member, thereby providing said roll control actuator with said actuation flow as required to oppose a predicted lateral weight transfer of said motor vehicle.

7. A roll control system according to claim 6, wherein said roll control actuator comprises a front roll control actuator and a rear roll control actuator.

8. A roll control system according to claim 6, wherein said roll control signal is determined according to the following relationship:

$$RCS = A*V^2/(B+C*V^2)$$

wherein: RCS=roll control signal;
A,B,C=constants based on vehicle characteristics; and
V=speed of the motor vehicle.

9. A roll control system according to claim 6, wherein said fluid pump comprises a constant flow power steering pump.

10. A method for controlling a dynamic roll control system in an automotive vehicle, comprising the steps of:

providing a supply flow to a roll control valve;

determining a vehicle speed and generating a vehicle speed signal therefrom;

calculating a roll control signal from said vehicle speed signal and a lateral weight transfer property of said vehicle;

adjusting said roll control valve according to said roll control-signal to create an actuation flow responsive to a predicted lateral weight transfer of said motor vehicle;

adjusting a distribution valve to distribute said actuation flow to a roll control actuator to oppose said predicted lateral weight transfer of said motor vehicle.

11. A method for controlling a dynamic roll control system according to claim 10 wherein said roll control signal is calculated according to the following relationship:

$$RCS = A*V_2/(B+C*V^2)$$

wherein: RCS=roll control signal;
A,B,C=constants based on vehicle characteristics; and
V=speed of the motor vehicle.

* * * * *